United States Patent
Pionetti et al.

(10) Patent No.: US 11,338,526 B2
(45) Date of Patent: May 24, 2022

(54) METHOD FOR ASSEMBLING THERMOPLASTIC TUBES BY INDUCTION WELDING

(71) Applicant: SAIPEM S.A., Montigny le Bretonneux (FR)

(72) Inventors: François-Régis Pionetti, La Baleine (FR); Taoufik Majdoub, Bobigny (FR); Axel Sundermann, Fontenay-les-Briis (FR); Jalil Agoumi, Le Kremlin-Bicetre (FR)

(73) Assignee: Saipem S.A., Montigny le Bretonneux (FR)

( * ) Notice: Subject to any disclaimer, the term of this patent is extended or adjusted under 35 U.S.C. 154(b) by 346 days.

(21) Appl. No.: 16/347,525

(22) PCT Filed: Oct. 24, 2017

(86) PCT No.: PCT/FR2017/052931
§ 371 (c)(1),
(2) Date: May 3, 2019

(87) PCT Pub. No.: WO2018/083397
PCT Pub. Date: May 11, 2018

(65) Prior Publication Data
US 2019/0283338 A1    Sep. 19, 2019

(30) Foreign Application Priority Data
Nov. 4, 2016    (FR) .................................... 16 60718

(51) Int. Cl.
*B29C 65/00*    (2006.01)
*B29C 65/36*    (2006.01)
(Continued)

(52) U.S. Cl.
CPC .... *B29C 66/52272* (2013.01); *B29C 44/1295* (2013.01); *B29C 65/36* (2013.01);
(Continued)

(58) Field of Classification Search
CPC ........... B29L 2023/22; B29C 66/73921; B29C 66/5221; B29C 66/52272; B29C 65/36
See application file for complete search history.

(56) References Cited

U.S. PATENT DOCUMENTS

| | | | | |
|---|---|---|---|---|
| 4,728,223 A | * | 3/1988 | Rice .......................... | E03F 3/06 138/97 |
| 4,749,833 A | * | 6/1988 | Novorsky ........... | B29C 65/7802 156/272.4 |

(Continued)

FOREIGN PATENT DOCUMENTS

| DE | 2136656 | 2/1973 |
|---|---|---|
| DE | 19718790 | 11/1998 |

(Continued)

*Primary Examiner* — Daniel McNally
(74) *Attorney, Agent, or Firm* — Cozen O'Connor

(57) ABSTRACT

A method for assembling two tubes (1, 2) made from thermoplastic materials, that involves welding by heating two applied rotational contact surfaces of two parts of two tubes (1, 2), respectively, arranged end to end or overlapping coaxially (XX'). The method involves induction heating of at least one conductive welding element (4), arranged at the interface (3) between the two contact surfaces, by generating a magnetic field at said conductive welding element or elements, such that the melting of the thermoplastic materials constituting said contact surfaces produces a continuous and sealed weld at said interface on at least one closed loop along the entire perimeter of said interface.

10 Claims, 3 Drawing Sheets

(51) Int. Cl.
*F16L 47/02* (2006.01)
*B29C 44/12* (2006.01)
*B29L 23/00* (2006.01)
*B29K 705/12* (2006.01)
*B29K 23/00* (2006.01)
*B29C 70/66* (2006.01)
*B29K 75/00* (2006.01)
*B29K 509/08* (2006.01)

(52) U.S. Cl.
CPC ...... *B29C 65/3608* (2013.01); *B29C 65/3632* (2013.01); *B29C 65/3668* (2013.01); *B29C 66/1122* (2013.01); *B29C 66/1162* (2013.01); *B29C 66/14* (2013.01); *B29C 66/232* (2013.01); *B29C 66/5221* (2013.01); *B29C 66/53241* (2013.01); *B29C 66/612* (2013.01); *B29C 66/72321* (2013.01); *B29C 66/73921* (2013.01); *F16L 47/02* (2013.01); *B29C 65/3676* (2013.01); *B29C 65/3684* (2013.01); *B29C 66/634* (2013.01); *B29C 66/636* (2013.01); *B29C 66/71* (2013.01); *B29C 66/919* (2013.01); *B29C 70/66* (2013.01); *B29K 2023/12* (2013.01); *B29K 2075/00* (2013.01); *B29K 2509/08* (2013.01); *B29K 2705/12* (2013.01); *B29L 2023/22* (2013.01)

(56) References Cited

U.S. PATENT DOCUMENTS

| | | | |
|---|---|---|---|
| 2011/0193339 A1* | 8/2011 | Kenworthy | F16L 47/03 285/21.2 |
| 2013/0114945 A1* | 5/2013 | Pionetti | B29C 65/3468 392/472 |
| 2013/0228265 A1 | 9/2013 | Tailor | |

FOREIGN PATENT DOCUMENTS

| | | | |
|---|---|---|---|
| EP | 0 722 824 | 7/1996 | |
| EP | 2452805 | 5/2012 | |
| EP | 2886285 | 6/2015 | |
| JP | H03129195 | 6/1991 | |
| JP | H0584829 | 4/1993 | |
| JP | H09150458 | 6/1997 | |
| WO | WO 9628683 | 9/1996 | |
| WO | WO2004106038 | 12/2004 | |
| WO | WO2007128384 | 11/2007 | |
| WO | WO 2010/041016 | 4/2010 | |
| WO | WO 2012/017171 | 2/2012 | |
| WO | WO 2012051719 | 4/2012 | |
| WO | WO 2018/065769 | 4/2018 | |
| WO | WO-2018065769 A1 * | 4/2018 | ......... B29C 65/3632 |
| WO | WO 2018/083397 | 5/2018 | |

* cited by examiner

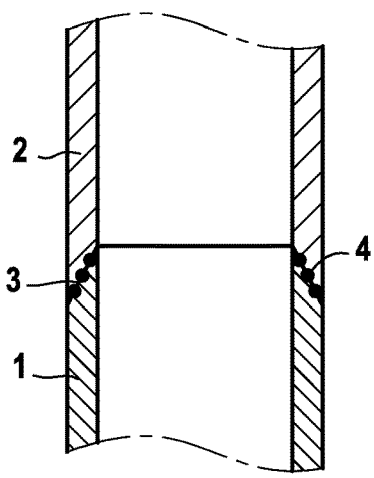
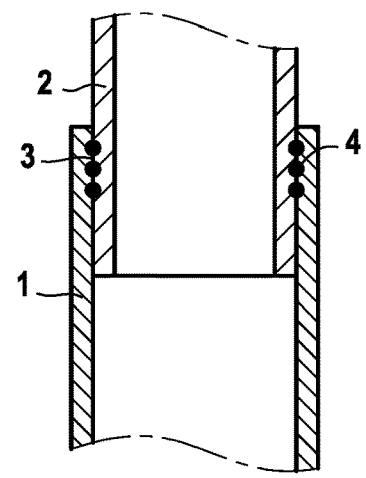
FIG.1A  FIG.1B
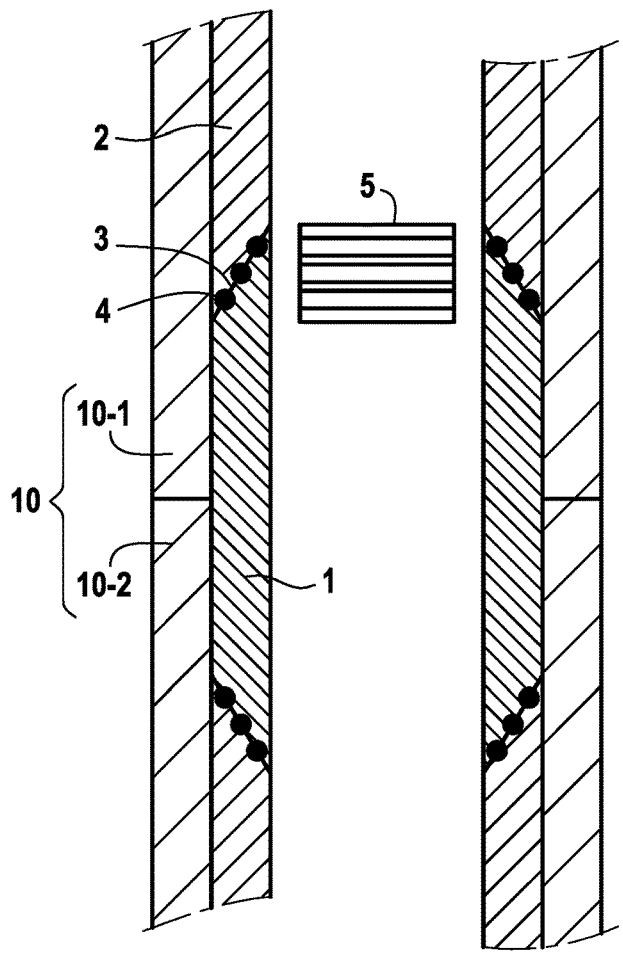
FIG.2

METHOD FOR ASSEMBLING THERMOPLASTIC TUBES BY INDUCTION WELDING

PRIORITY CLAIM

This is a U.S. national stage of application No. PCT/FR2017/052931, filed on Oct. 24, 2017. Priority is claimed on France Application No. FR1660718, filed Nov. 4, 2016, the content of which is incorporated here by reference.

BACKGROUND OF THE INVENTION

The present invention relates to a method of assembling together tubes made of thermoplastic materials by induction welding. More particularly, the present invention applies to assembling together at least two tubes arranged in abutment or overlapping coaxially at least in part.

The present invention relates to the general field of fluid transport pipes, in particular undersea pipes resting on the sea bottom or providing a bottom-to-surface connection for transferring hydrocarbons, e.g. oil and gas coming from undersea production wells. The present invention relates more particularly to assembling together undersea pipes that convey corrosive fluids, in particular sea water under pressure that is to be injected into oil field wells.

These undersea pipes generally comprise a tube made of steel alloy that is covered in an outer insulating coating and/or an inner coating or lining, referred to as a "liner", that is typically made of a thermoplastic polymer. These two coatings limit the loss of heat to the surrounding medium and/or provide protection against corrosion. The thickness of these coatings varies depending on the operating conditions applicable to the fluid that is to be transported (length of the pipe, temperature of the fluid, composition of the fluid, etc.).

The present invention relates more particularly to connecting together two unit elements of such pipes that are fitted with inner coating(s).

Generally, such pipes are assembled on land in the form of elements of unit length (referred to as double, triple, or quadruple "joints", with the term "quad-joint" being used below for all such elements of unit length). Quad-joints are then taken to sea on board a laying ship. While being laid, the quad-joints are connected to one another on board the ship progressively as the pipe is laid at sea. Laying may take place by using a J-lay tower or an S-lay tower positioned on board the laying ship. With J-laying, the undersea pipe is typically lowered from the laying ship almost vertically (in the range +30° to −10° relative to the vertical). J-laying is single catenary laying in which the almost vertical angle of inclination of the pipe decreases progressively on going down until it matches the slope of the sea bottom. With S-laying, the undersea pipe is typically lowered from the laying ship while practically horizontal and it curves subsequently in order to reach the sea bottom.

The J-lay and S-lay techniques require each new quad-joint to be connected on board the laying ship to the undersea pipe prior to being lowered into the sea while simultaneously moving the laying ship. This step of connecting a new quad-joint to the undersea pipe is performed by welding together the abutting free steel ends of the respective tubes of the new quad-joint and of the undersea pipe. Connecting a new quad-joint to an insulated undersea pipe is made possible by a preliminary operation that is performed after the quad-joints have been coated and/or lined in the factory, this operation consisting in removing the insulating coating and/or liner over a defined length from the ends so as to enable welding equipment and non-destructive inspection equipment to be put into place.

In known manner, the liner inside such pipe elements stops at a significant distance, e.g. 100 millimeters (mm) to 300 mm from the ends of said pipe elements, so that the heating of the steel walls during welding of the ends does not damage said liner. The problem that then arises is ensuring protection against corrosion for the non-lined zone that extends between the end of the liner of pipe element N and the end of the liner of the following pipe element N+1.

In EP 0 722 824, WO 2010/041016, and WO 2012/017171, a tubular junction sleeve is described that is provided with heater wires operating by the Joule effect when they are electrically powered and serving to weld said sleeve to the liner present in a steel pipe element by electrofusion, said tubular junction sleeve serving to assemble together two pipe elements in abutment by providing a junction between the two liners of the two pipe elements on either side, while allowing junction welding to be performed between the two pipe elements.

It is important for contact between the sleeve and the liner to be leakproof in order to avoid any contact between the injected water and the weld zone facing said tubular sleeve. Specifically, when the pipe is a water injection pipe, any such direct contact, in the event of water penetrating between the sleeve and the pipe, could lead to phenomena of electrochemical corrosion of the steel pipe and of the weld, insofar as said mechanical connection between the sleeve and the liner is not necessarily leakproof.

SUMMARY OF THE INVENTION

The object of the present invention is to avoid using electrofusion welding heater wires since they require connectors and they tend to give rise to defects in the weld zone and to preferred leakage paths, which can potentially make the weld zone more fragile.

In general manner, the object of the present invention is to provide a novel type of fusion welding of plastics materials at an abutting or overlapping assembly between two thermoplastic tubular elements, which method is more accurate, more reliable, and can be performed more quickly. Another object is to provide fusion welding of thermoplastic materials for assembling together two tubular elements in a manner that is leakproof, thereby eliminating any risk of leaks that might run along a heater wire, giving rise to a leaky weld, as discussed in WO 2012/017171.

Once the ends of the pipe elements have been welded together, it is also necessary for the zone of the pipe containing the metal weld together with the portions of the pipe tube from which the thermoplastic outer insulating coating has been removed (which zone is referred to as a "cut-back") to be covered with a new insulating coating while ensuring that this coating is laid in such a manner that it is totally leakproof with the remainder of the outer insulating coating of the pipe. For this purpose, the cut-back zone of the insulating coating may be covered by a plurality of successive layers of different polymer materials. That method of applying the outer insulating coating over the cut-back zone in the coating is known as "field joint coating", and is described for example in WO 2012/098528. Nevertheless, that field joint coating technique presents various drawbacks. In particular, it requires a relatively long time to perform, which is therefore constraining (typically of the order of 20 minutes (min) to 30 min per operation). That technique also presents a problem of the insulating coating of the pipe adhering to the cut-back zone.

To do this, the present invention provides a method of assembling together two tubes of thermoplastic materials, wherein said assembly is performed by welding by heating two contact surfaces of revolution that are pressed one against the other and that belong respectively to two portions, preferably end portions, of two tubes placed in abutment or overlapping coaxially, the two tubes comprising a) a first tube (1) constituted by a rigid tubular junction sleeve made of thermoplastic material inserted coaxially inside a first steel pipe element that is metal-welded or that is to be metal-welded in abutment with a second pipe element, and b) a second tube (2) constituted by a coating of thermoplastic material applied as a liner of said made of steel pipe elements, wherein at least one conductive welding element that is preferably made of metal and more preferably of steel, and that is arranged at the interface between the two contact surfaces of the two tubes made of thermoplastic materials is heated by induction by generating a magnetic field at said conductive welding element(s) so that the melting of the thermoplastic materials constituting said contact surfaces as a result of said induction heating of said conductive welding element(s) provides a continuous and leakproof weld at said interface over at least one closed loop around the entire perimeter of said interface, the method being characterized in that an electromagnetic field is generated at said interface (3) using an electromagnetic induction coil (5) arranged coaxially inside the two tubes and a plurality of coaxial circular welding zones are provided arranged side by side in parallel along the axial direction (XX') of said tubes.

In the present application, the concept of a "tube made of thermoplastic material" extends to any arrangement of thermoplastic material to form a cylindrical surface or a surface of revolution, regardless of whether it is sufficiently rigid to retain a tubular shape on its own without support, and in particular any type of fluid pipe, or whether it is not sufficiently rigid to retain its tubular shape on its own and is thus supported by or applied against a rigid tubular support, in particular any type of fluid pipe.

The term "conductive welding element" is used herein to mean an element made of conductive material, e.g. an element made of a material comprising a metal, in particular steel, copper, aluminum, or brass, or a semiconductor material, such as carbon, graphite, or silicon carbide.

It can be understood that the induction is performed by generating a magnetic field at said interface, which magnetic field generates eddy currents in said conductive welding elements. The eddy currents cause the conductive elements to heat by the Joule effect and thus serve to weld together surfaces made of thermoplastic material by melting the thermoplastic materials of the two contacting surfaces around said welding elements by the Joule effect. The way the conductive elements are arranged must ensure that the thermoplastic tubes are welded together and ensure leakproofing between the inside and the outside of the tubes where they are welded together.

In an implementation, a said weld zone is made with a welding element constituted by an element that is continuous in a closed loop around the entire perimeter of said interface, preferably a said circular weld zone is made with a welding ring arranged coaxially with said tubes. In other words, the axis of said tubes is perpendicular to the plane of the ring.

In another implementation, said weld zone is made with a plurality of discontinuous conductive welding elements that are juxtaposed or spaced apart extending around the entire perimeter of said interface, preferably a plurality of conductive welding balls arranged circularly so as to extend around the entire circumference of said interface in cross-section. The term "cross-section" is used herein to mean a section in a plane that is perpendicular relative to the axial longitudinal direction of said contact surfaces of revolution of said tubes.

It can be understood that said discontinuous conductive welding elements that are juxtaposed or spaced apart are arranged close enough together to ensure that the zone of welding by melting extends over the entire perimeter of said closed loop interface, and in particular over the entire space in the gaps between two consecutive discontinuous welding elements. The term "closed loop around the entire perimeter of a said surface of revolution" is used herein to mean a loop that goes all around the longitudinal axis of said tube in a closed circuit.

More particularly, the conductive welding elements are of thickness that is small relative to the thickness of the tubes at said contact surfaces so that they remain completely embedded in the thermoplastic materials at said interface.

Still more particularly, the thickness of the welding elements is less than or equal to half the thickness of the tube of smaller thickness at said contact surfaces where the elements are installed.

More particularly, in order to generate eddy currents in said conductive element, conductive welding elements are used that present a pseudo-axis of revolution extending parallel to the axis of the magnetic field and thus, where applicable, parallel to the axis of the induction coil generating the magnetic field. Specifically, these conductive elements are subjected to induced currents that are a function of the dimensions of the conductive elements and of the excitation frequency of the coil.

The shape of the conductive welding elements may be selected so as to avoid stress concentrations appearing after welding, with it being preferred to use shapes that are smooth, of spherical type or of circular section type for a ring.

The induction welding of the present invention imparts improved quality to the weld without any risk of leakage since welding takes place all along a closed circuit, with a reduced risk of weld failure, and, as a result of the weld zone being located accurately and being small in size, with the time required for cooling also being shorter than the time required for electrofusion using a coil and a heater wire, since the heat at the point of melting is localized around the conductive welding elements.

Another advantage of the induction welding of the present invention compared with electrofusion welding is to be able to perform welding remotely, i.e. without direct contact between the power supply and the welding elements, thereby eliminating the constraint of using heater wires and of positioning electrical connectors for the heater wires in one of the tubes, in particular in a said tubular junction sleeve.

In the present invention, it is possible to perform melting at a temperature higher than 100° C. over a thickness in the range 1 mm to 3 mm, with welding elements that present a section lying in the range 0.1 square millimeters ($mm^2$) to 2 $mm^2$.

Thus, the induction welding can be performed on tubes that are to be assembled presenting thicknesses of less than 5 mm or even down to 3 mm, which is not possible with electrofusion welding.

All of these advantages of the induction welding of the present invention serve to maximize reliability and thus to optimize working time when performing the welding and also when making use of the welding for assembling together tubes in accordance with the present invention.

The width of each weld zone made in this way by induction welding lies in practice in the range 1 mm to 5 mm, preferably in the range 2 mm to 4 mm, for a section lying in the range 1 mm² to 2 mm². The welded zone is the zone of contact between the tubes and the conductive elements, and it depends on the thermal conductivity of the material and on the welding time. Naturally, with a larger number of welding elements, there is a larger number of welds and thus a greater total width of welding.

In an implementation, the weld zones are spaced apart at a pitch in translation lying in the range 1 mm to 10 mm, preferably in the range 2 mm to 4 mm.

Each weld ring or succession of welding balls provides two continuous melting zones around the entire circumference, forming a double leak-proofing barrier on both sides of the ring at the contact surfaces where the thermoplastic materials are directly in contact with each other.

More particularly, the conductive welding elements are arranged in at least one peripheral pre-machined groove extending in a closed loop around the entire perimeter of said interface, preferably circularly around the entire circumference of one of the two contact surfaces.

More particularly, said contact surfaces of revolution of said overlapping first and second tubes for welding together are cylindrical or frustoconical in shape about the same axis as the longitudinal axis XX' of said tubes.

More particularly, the thermoplastic materials of said tubes for assembling together by induction welding may for example be polyethylene (PE), polypropylene (PP), polyvinyldiene fluoride (PVDF), or high density polyethylene (HDPE).

In an implementation, a plurality of coaxial circular zones are made side by side, having the same diameter on said cylindrical contact surfaces or having increasing diameters on said frustoconical contact surfaces.

Also in practice, the plurality of said welding zones extends over a length in the axial longitudinal direction of the contact surfaces that lies in the range 30 mm to 100 mm.

In a preferred implementation, an electromagnetic field is generated at said interface by using an electromagnetic induction coil which is excited at frequencies higher than 1 kilohertz (kHz).

In this invention, an electromagnetic field is preferably generated at said interface by using an electromagnetic induction coil arranged coaxially inside the two tubes.

Specifically, if the coil is placed outside and around the steel pipe, the frequency needs to be selected as a function of the steel and of the thickness of the steel pipe, so as to ensure that the characteristic penetration depth of the magnetic field (also referred to as the skin thickness) is greater than the thickness of the steel pipe. This thickness $\delta$ (delta) is given by the following formula:

$$\delta = \sqrt{\frac{2}{\omega \mu \sigma}}$$

where $\omega$ (omega) is the angular frequency, $\mu$ (mu) is the magnetic permeability of the material of the pipe, and $\sigma$ (sigma) is its conductivity.

If the coil is placed outside the pipe, like in WO 2012/051719, EP 2 425 805 and EP 2 886 285, the induced currents do not enable the contacting thermoplastic material to be heated to a temperature that is high enough to perform welding since a thermoplastic typically melts at a temperature higher than 100° C. and the efficiency of this way of heating the rings is extremely low.

In the present invention, it is guaranteed that the welding is leakproof because a plurality of coaxial circular weld zones are made side by side on either side of the conductive welding elements, and in particular of each welding ring or succession of welding balls, such that each said circular weld zone has two melting zones that are continuous all around the circumference so as to form a double sealing barrier on either side of the ring in the contact surfaces where the thermoplastic materials come directly into contact with each other.

More particularly, the two tubes are constituted by:

a second tube formed by a liner tube made of thermoplastic material for a first unit pipe element, a first end of the second tube not covering an end portion of said first unit pipe element; and a first tube formed by a rigid tubular junction sleeve having a first end arranged inside said first unit pipe element made of steel at said end portion that is not provided with said liner, the second end of said tubular junction sleeve being arranged or being for arranging inside an end of a second unit pipe element made of steel that does not have said liner, with the remainder of the inner surface of the second unit pipe element being covered in a said liner, said tubular junction sleeve overlapping or being for overlapping a metal weld zone between the abutting ends of two unit pipe elements;

said first end of the first tube and said first end of the second tube overlapping or being of complementary frustoconical shape suitable for being placed in abutment one against the other in order to form said contact surfaces.

According to other characteristics of this variant:

said liner presents at at least one end an end portion of thickness that is reduced relative to the thickness of the main portion of said liner, thereby defining a concave shape with an inner surface forming a said contact surface of revolution that is preferably frustoconical or cylindrical, and of inside diameter greater than the inside diameter of the inner surface of the main portion of said liner; and said sleeve presents at at least one end an end portion of thickness that is reduced relative to the thickness of the adjacent main portion of said sleeve, said end portion of the sleeve defining a convex shape suitable for overlapping and coming into abutment against the concave end portion of reduced thickness of said liner with which it is in contact, said end portion of the sleeve defining an outer surface corresponding to a said contact surface of revolution that is preferably frustoconical or cylindrical, being of outside diameter smaller than the outside diameter of the adjacent main portion of the sleeve and having a cylindrical inner surface of substantially the same inside diameter as the inside diameter of the main portion of the liner and of the main portion of the sleeve, and said inner surface of revolution constituting a said contact surface of said liner is induction-welded with said outer surface of revolution constituting a said contact surface of said sleeve.

It can be understood that because of their complementary shapes, said end portion of the sleeve and said end portion of reduced thickness of the liner enable the sleeve to be inserted against the inner surface of the end portion of reduced thickness of the liner merely by forcing said sleeve in the axial longitudinal direction XX' into the inside of said pipe element, and the outer surface of said end portion of reduced thickness of the sleeve and the inner surface of the end portion of reduced thickness of the liner with which it is in contact present identical complementary shapes and they are positioned relative to each other so as to fit closely around their identical outlines.

The present invention also provides a process for connecting together two unit elements of a fluid transport pipe, each unit pipe element being made of metal alloy and being covered in a liner made of a thermoplastic material with the exception of an end portion not having a liner, the process comprising:

a step of metal welding together the two unit pipe elements placed in abutment at their end portions not having a liner so as to form a cut-back zone in the liner;

a step of positioning a tubular sleeve inside the cut-back zone in the liner and in part around the liners of the two unit pipe elements, the sleeve being made of a thermoplastic material; and a step of fastening the sleeve on the liners of the two unit pipe elements in leakproof manner by induction welding using an assembly method by induction welding in accordance with the above-defined invention.

BRIEF DESCRIPTION OF THE DRAWINGS

Other characteristics and advantages of the present invention appear in the light of the following detailed description given with reference to the following figures.

FIG. 1A is a diagrammatic longitudinal section view of two tubes 1 and 2 on a common axis assembled together in abutment, their ends presenting complementary frustoconical surfaces that are superposed and assembled together by induction welding using a plurality of welding rings 4 arranged side by side at their interface 3.

FIG. 1B is a diagrammatic longitudinal section view of two tubes 1, 2 on a common axis that overlap at their superposed ends, which are assembled together by induction welding using a plurality of welding rings 4 that are arranged side by side at their interface 3.

FIG. 2 is a diagrammatic longitudinal section view of an inner tubular junction sleeve 1 between two pipe elements or pipe unit lengths 10-1, 10-2 coated with an liner 2 having frustoconical end portions of the sleeve and of the liner assembled together in abutment by induction welding using a plurality of welding rings 4 arranged side by side at their interface 3 together with an induction coil 5 inside the pipe.

DETAILED DESCRIPTION OF THE PRESENTLY PREFERRED EMBODIMENTS

Figure 3A:
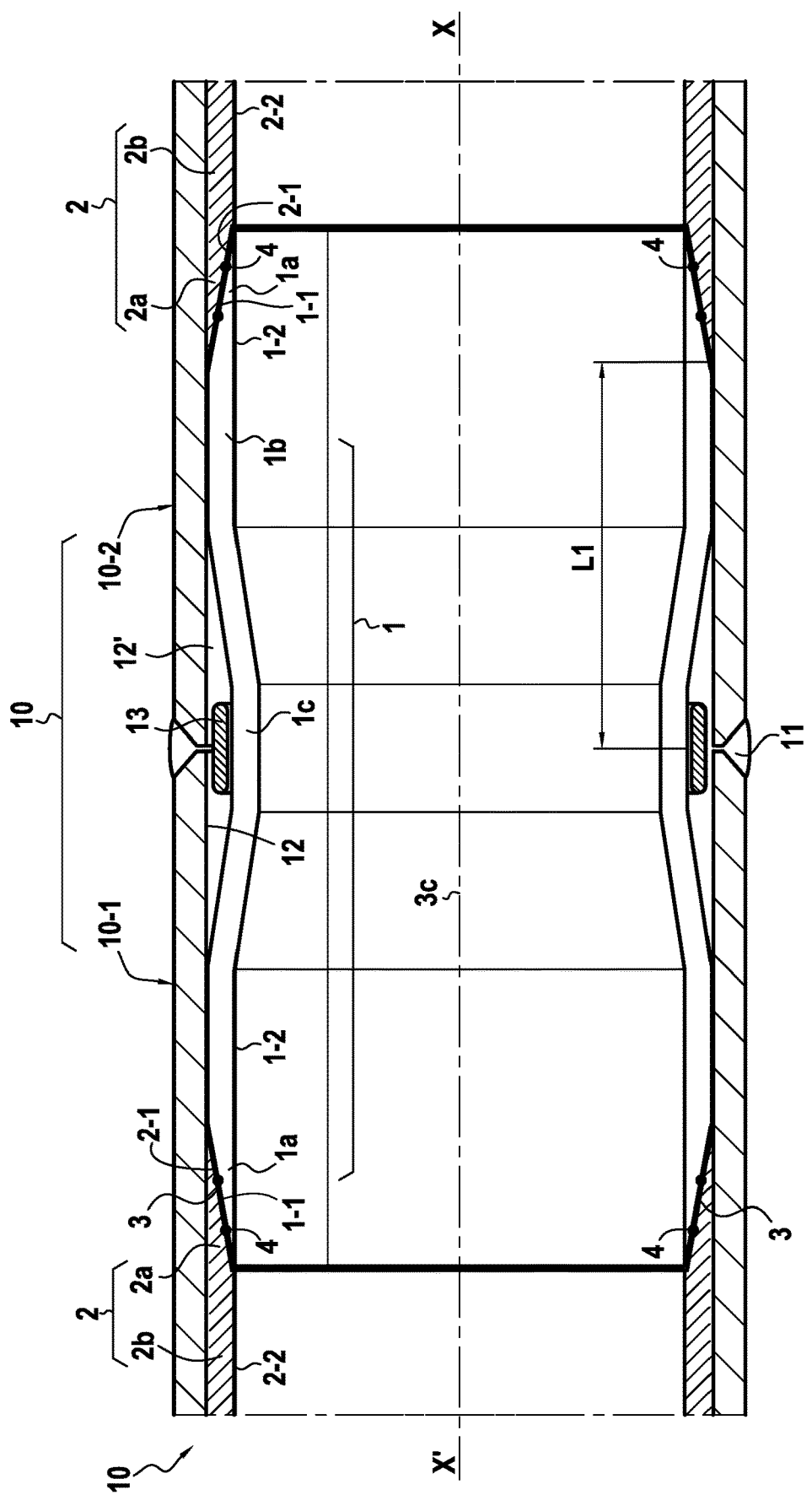
FIG. 3A is a side view in section of the assembly of a pipe as shown in FIG. 2, showing in detail a particular implementation of the inner tubular junction sleeve between two pipe elements 1.

The terms "inner" and "outer" are used herein to mean respectively inside and outside the pipe, the sleeve, or the liner, as appropriate.

In FIGS. 1A and 1B, there can be seen circular section welding elements 4 arranged at the interface 3 between the two contact surfaces that are assembled together by induction welding two tubes 1 and 2 made of thermoplastic material. These conductive welding elements 4 may either be rings made of steel having the same axis as the tubes, specifically three rings in this example, or else pluralities of balls arranged circularly in the proximity of one another so as to form three circular weld zones that are arranged side by side in the axial direction XX' in both situations.

These conductive welding elements may be pre-installed in grooves that may be machined equally well in one or both of the surfaces that are to be welded together. The conductive element 4 is of relatively small thickness compared with the thickness of the tubes, which can be machined on the surface so as to form grooves going around the circumference of the tube, preferably having a depth that allows the welding element 4 to project beyond the contact surface.

If the conductive welding ring presents an outside diameter that is slightly less than the inside diameter of the tube, it is possible to place it inside the tube 1 and then press it against a said inner contact surface of a tube made of rigid thermoplastic material (FIG. 1B) by deforming it radially outwards in the previously machined groove. Once the ring 4 has been deformed it takes up a circular shape and is well inserted inside the groove. This deformation may be performed by positioning inside the ring an inflatable element, of the silicone balloon type, and by inflating it.

Alternatively, the welding ring may be applied on the outer surface of the tube 1 (FIG. 1A) by deforming the tube using a die in order to reduce its outside diameter temporarily, so as to insert the welding ring in a groove that has previously been machined around the circumference of the tube. Another die may then be used for returning the tube to its initial outside diameter.

In another alternative, it is possible to use a ring that is split (like a piston ring) with an overlap zone so as to allow the ring to be extended radially so as to enable it to be put into place in the groove of larger diameter prior to shrinking elastically with less overlap. Also alternatively, it is possible to use a segment inserted into the tube in the smallest diameter groove by reducing the segment radially with greater overlap.

When using steel balls as welding elements, the balls may be inserted by compression into the inside of the groove so as to occupy one of said contact surfaces.

Assembling together an inner sleeve and a pipe liner is described hereinafter.

Figure 3B:
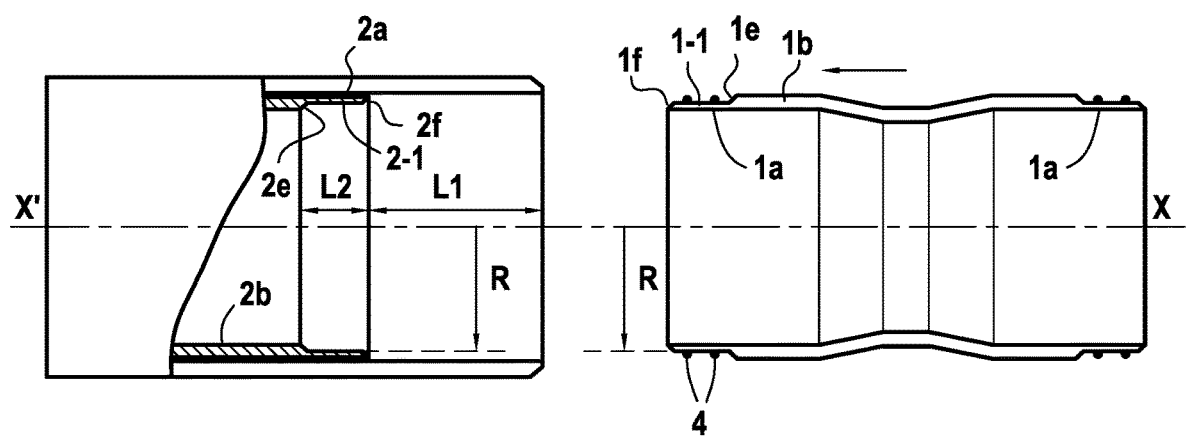
FIG. 3B is a side view in section of a steel pipe 10 having an liner 2 machined to form a female cylinder of axis XX' and of inside radius R that receives a tubular sleeve in another implementation presenting two ends that are machined to form a male cylinder of axis XX' and of outside radius that is substantially equal to R or slightly greater.

FIGS. 2 and 3A-3B show a first implementation in which ends of a tubular junction sleeve 1 inside a pipe 10 are welded to the ends of a liner of the pipe.

In this implementation, an induction coil 5 with its core and its coaxially-arranged turns is placed inside the pipe so as to create a magnetic field at the interface 3 between the contact surfaces 1-1 and 2-2 of the sleeve and of the liner that are made of thermoplastic material.

In FIG. 3A, there can be seen a pipe 10 having at least two pipe elements 10-1, 10-2 of axis XX' that are assembled in abutment, the pipe elements having liners 2 made of polyethylene or polypropylene, and the figure shows the ends of the two pipe elements that are welded together at 11. At each end, each pipe element presents a conical end portion 2a, the end portion having a half-angle at the apex □ lying in the range 5° to 15°, in particular equal to 10°, and thus of thickness that is smaller than the main portion 2b of said liner, thereby defining a concave shape with a frustoconical inner surface of revolution comprising a contact surface 2-1 of inside diameter greater than the inside diameter of the main portion 2b of said liner and terminating at a certain distance L1 from each end of said pipe element, thus forming an end portion 12 not having any liner.

A rigid tubular junction sleeve 1 made of thermoplastic material, preferably identical to the thermoplastic material of the liner 2, and of axis XX' coinciding substantially with the axis of the pipe elements 10-1, 10-2, and having the same outside diameter just a little less than the inside diameter of the pipe, is inserted inside each of the abutting ends of the two pipe elements so as to overlap said end portions 2a of the two liners. At each longitudinal end, said sleeve 1 presents an end portion 1a defining a convex conical shape suitable for overlapping the end portion of said liner 2a with which it is in contact. Said end portion 1a of the sleeve defines a frustoconical outer surface 1-1 having the same angle at the apex □ as said frustoconical inner surface of said concave end portion of said liner. The conically-shaped end portions of the sleeve define a cylindrical inner surface 1-2 of substantially the same inside diameter as the inside diameter of said main portions 2b of the liner.

In FIG. 3A, in a central portion 1c, i.e. a portion about halfway along it in its axial longitudinal direction XX', the sleeve presents a smaller outside diameter that is less than the outside diameters of its main portions 1b that are adjacent to said central portion 1c so as to provide an annular space 12' in which it is possible to place an annular thermal protection part 13 for protecting the sleeve while welding the ends of the pipe elements together, said main portions 1b of the sleeve presenting an outside diameter that is substantially identical to the inside diameter of the non-covered ends of said liners of the assembled-together pipe elements.

The term "main portion of the sleeve" is used herein to mean the central portion of the sleeve situated between the end portions at the two longitudinal ends of the sleeve.

The tubular wall of said sleeve presents a central portion 1c suitable for deforming in order to adopt an inside diameter substantially equal to the inside diameter of the remainder of the sleeve under the effect of the fluid flowing inside the pipe in operation having an internal pressure of at least 1 megapascal (MPa), and the thermal protection part 13 is of small thickness and can itself be deformable under the same conditions of pressure inside the pipe in order to adopt a reduced thickness, preferably a thickness of less than 5 mm, more preferably less than 2 mm, said thermal protection part more preferably being constituted by ceramic fibers in a form similar to cotton wool.

In FIG. 3B, said inner surface of the smaller thickness end portion 2a of the liner and said outer surface of the smaller thickness end portion 1a of the sleeve that are in contact with each other have the same cylindrical shape about the same axis XX' as said sleeve and said pipe, the end of the reduced thickness end portion of the sleeve coming into abutment against a shoulder 2e defining the inner surfaces of said main portion 2b and of the reduced thickness end portion 2a of the liner.

In this implementation having cylindrical contact surfaces 1-1 and 2-1, said sleeve is inserted against the reduced thickness end portion 2a of the liner until the end 2f of the liner comes into abutment against a shoulder 1e defining said main portion 1b of the sleeve and said smaller thickness end portion 1a of the sleeve, and/or said sleeve is inserted against the reduced thickness end portion 2a of the liner until the end 1f of the sleeve comes into abutment against the shoulder 2e defining the main portion 2b and said reduced thickness end portion 2a of the liner.

Similarly, in FIG. 3B, the end of said pipe has been machined cylindrically about the axis X'X at a radius R over a length L2 to a distance L1 so as to uncover an end portion 12 that is not covered in liner.

There are thus several ways in which the liners and the tubular junction sleeves can be assembled together, each presenting an advantage relating to the thickness of the liner 2. The value of the angle □ between the axis XX' and a generator line of the surface of the end portion 1a of the sleeve in contact with the end portion 2a of the liner may lie in the range 0 to 90°. For the implementations shown in FIGS. 3A and 3B, an end portion 1a of conical convex shape is shown with a conical outer surface presenting a half-angle at the apex □ lying in the range 0 (FIG. 3B) and 90° (end-on-shape, not shown).

For liners of small thickness, the preferred technique comprises overlap with a sleeve of constant diameter and constant thickness, e.g. in the range 3 mm to 5 mm. For thicknesses greater than 5 mm, e.g. in the range 6 mm to 20 mm, it is advantageous to use a conical technique (FIG. 3A) or a cylindrical technique with a sleeve of thickness that is not constant at the ends (FIG. 3B). With the conical technique, an angle □ lying in the range 5° to 45°, and preferably equal to 10°, then enables pressure to be applied without giving rise to a slope discontinuity. For medium thicknesses, it is advantageous to use the cylindrical technique of FIG. 3B. For large thicknesses, e.g. greater than 20 mm, it is advantageous to use the end-on technique for the right section with concentric rings (not shown).

The method of the invention makes it possible to obtain circular weld zones at the interface 3 between the contact surfaces 1-1 and 2-1 that are of very good quality and very strong, with a weld line on either side of each element 4, over a depth and a width of less than 5 mm, thus making it possible to weld tube thicknesses of up to 25 mm (not limiting), and more particularly lying in the range 5 mm to 25 mm. It is thus possible to provide a plurality of circular weld zones extending in the axial direction by using a plurality of side-by-side circles that are spaced at 5 mm intervals, for example, and that together extend over a distance in the range 20 mm to 100 m along the axis XX'.

In another implementation, in particular when the liner and said sleeve are of smaller thickness, in particular thickness less than 5 mm, use is made of the following:

a said liner presenting at at least one end an end portion having the same thickness as the thickness of the main portion of said liner, defining a cylindrical inner surface corresponding to a said contact surface having the same inside diameter as the inside diameter of the inner surface of the main portion of said liner; and said sleeve presents at at least one end an end portion having the same thickness as the thickness of the adjacent main portion of said sleeve, said end portion of the sleeve defining:

a cylindrical outer surface corresponding to a said axisymmetric contact surface of outside diameter substantially identical to or slightly greater than (sleeve inserted by force) the inside diameter of said liner; and a cylindrical inner surface of inside diameter less than the inside diameter of the inner surface of said liner;

said end portion of the sleeve thus being suitable for overlapping in superposed manner the end portion of said liner with which it is in contact; and welding is performed by induction between said cylindrical inner surface constituting a said contact surface of said liner and said cylindrical outer surface constituting a said contact surface of said sleeve.

Such an implementation has two advantages:

a) firstly, in this implementation, the liner tube is easily put into place since:

because of the small thickness of the liner and above all its smaller weight, the traction required on the liner tube in order to stretch it while it is being laid is reduced; and because of the small thickness of the sleeve, said cylindrical contact surfaces of said liner and said sleeve to be welded together overlap and can be superposed without requiring the liner to be machined; and b) secondly, in the event of end portions of the sleeve and of the liner being superposed, the inside diameter difference between the inner surface of said liner and the inner surface of said sleeve is small enough to avoid disturbing the flow of fluid in the pipe.

The thickness required for the liner is mainly determined by the length of the pipe in which plastics material is applied by stretching, given the risk of tearing the liner or of stretching it irreversibly.

Such an implementation with liners of small thickness less than 5 mm is possible with unit pipe elements or strings presenting lengths of less than 100 meters (m), or less than 50 m for thicknesses up to 3 mm.

Furthermore, such an implementation using liner and sleeve thicknesses of less than 5 mm cannot be performed when using electrofusion welding because, for electrofusion, the sleeve needs to have the heater wire passed therethrough in order to reach its outer surface where the heater wire then causes the sleeve to melt over its entire thickness.

The implementation with a zone of welding by induction is advantageous in that it makes it possible to ensure leakproofing that is more complete and more reliable between the contact surfaces of said end portions of the sleeve and of the liner so as to avoid any risk of metal welding coming into contact with the water in the pipes, when such pipes convey water, and thus avoid any risk of the zones situated between the outer surface of the sleeve and the inner surfaces of said pipe elements being invaded, which would inevitably lead to a reduction in the inside diameter of the sleeve, i.e. of the flow section for the fluid, and would thus lead to disturbances in the flow of fluid inside the sleeve, without mentioning the risk of said welds coming into contact with water, when said pipe conveys water.

More particularly, the pipe that is to be made is a connection pipe lying on the sea bottom, or else a bottom-to-surface connection pipe suitable for being laid under the surface of the sea, and said pipe elements present a length lying in the range 20 m to 50 m, an inside diameter lying in the range 10 centimeters (cm) to 60 cm, and said sleeve presents a length lying in the range 45 cm to 600 cm. The pipe is constituted more particularly by a pipe for injecting water under pressure into oil field wells, which pressure is always higher than 5 MPa, and lies in particular in the range 25 MPa to 70 MPa (250 bars to 700 bars). As mentioned above, this type of pipe is particularly stressed at said metal welds such that they need to be protected as much as possible against any corrosion by contact with sea water, particularly in bottom-to-surface connections, since under such circumstances the pipe is perpetually in movement because of the effects of swell, of the wind, and of currents acting on the floating support at the surface, and is therefore subjected to extreme fatigue stresses. Furthermore, the properties of the fluid being conveyed may make it necessary to include an extra thickness of sacrificial steel that is large, thereby having a major impact on the installation of such pipes. Putting a plastic liner into place enables this need to be eliminated.

Induction welding consists in welding the sleeve 1 directly onto the liner 2 by means of one or more conductive elements 4 integrated in the sleeve when it is fabricated, as described above, the sleeve being made of a thermoplastic material that is thermochemically compatible with the thermoplastic material of the outer insulating coatings.

Thus, the sleeve 1 integrates a plurality of steel rings or balls 4 in its inner surface at each of its two longitudinal ends, the steel rings or balls 4 being received in grooves and projecting from the grooves so as to come into contact with the portions of the liner 2 that are covered by said sleeve.

During the welding step proper, these conductive elements 4 are heated by induction using the induction coil 5' so as to cause the material constituting the sleeve to melt at its surface in a manner that is suitable for providing leakproof fastening of the sleeve on the outer insulating coating at their interface 3. More precisely, dissipating the electrical power delivered to the conductive elements 4 by means of the Joule effect serves to cause the inside surface of the material constituting the sleeve to melt. Intimate mixing of the material of the sleeve with the material of the liners on the tubes serves to provide good cohesion and leakproofing between the sleeve and the liners.

The invention claimed is:

1. A method of assembling together two tubes of thermoplastic materials, wherein said assembly is performed by welding by heating two contact surfaces of revolution that are pressed one against the other and that belong respectively to two portions, of two tubes placed in abutment or overlapping coaxially (XX'), the two tubes comprising a) a first tube constituted by a rigid tubular junction sleeve made of thermoplastic material inserted coaxially inside a first steel pipe element that is metal-welded or that is to be metal-welded in abutment with a second steel pipe element, and b) a second tube constituted by a coating of thermoplastic material applied as a liner of said steel pipe elements, wherein said assembly is performed by welding by induction heating one or more of a plurality of conductive welding elements, and that is arranged at the interface between the two contact surfaces, of the two tubes made of thermoplastic materials, by generating a magnetic field at said one or more conductive welding elements so that a melting of the thermoplastic materials constituting said contact surfaces as a result of said induction heating of said one or more conductive welding elements provides a continuous and leakproof weld at said interface over at least one closed loop around the entire perimeter of said interface, wherein an electromagnetic field is generated at said interface using an electromagnetic induction coil arranged coaxially inside the two tubes and the one or more conductive welding elements arranged so as to provide a plurality of coaxial circular welding zones arranged side by side in parallel along the axial direction (XX') of said tubes, and wherein the conductive welding elements comprise a plurality of conductive welding balls arranged circularly so as to extend around the entire circumference of said interface in cross-section, the plurality of conductive welding balls having been integrated into the tubular junction sleeve during fabrication of the tubular junction sleeve.

2. The method according to claim 1, wherein:
the second tube is formed by said liner made of the thermoplastic material for said first steel pipe element, a first end of the second tube not covering an end portion of said first steel pipe element; and
the first tube is constituted by said rigid tubular junction sleeve having a first end arranged inside said first steel pipe element at said end portion that is not provided with said liner, the second end of said tubular junction sleeve being arranged or being for arranging inside an end of said second steel pipe element that does not have said liner, with a remainder of the inner surface of the second unit pipe element being covered in said liner, said tubular junction sleeve overlapping or being for overlapping a metal weld zone between the abutting ends of the first and second steel pipe elements.

3. The method according to claim 2, wherein said first end of the first tube and said first end of the second tube overlap one on the other to form said contact surfaces.

4. The method according to claim 3, wherein said liner and said sleeve are of thickness less than 5 mm, and use is made of:
said liner presenting at at least one end an end portion having the same thickness as the thickness of a main portion of said liner, defining a cylindrical inner surface corresponding to said contact surface having a same inside diameter as an inside diameter of the inner surface of the main portion of said liner; and
said sleeve presenting at at least one end an end portion having the same thickness as the thickness of an adjacent main portion of said sleeve, said end portion of the sleeve defining:
a cylindrical outer surface corresponding to said contact surface of revolution, of an outside diameter substantially identical to or slightly greater than an outside diameter of the inner surface of said liner; and
a cylindrical inner surface having an inside diameter less than the inside diameter of the inner surface of the main portion of said liner;
said end portion of the sleeve thus being suitable for overlapping in superposed manner the end portion of said liner with which it is in contact; and
induction welding said cylindrical inner surface constituting said contact surface of said liner with said cylindrical outer surface constituting said contact surface of said sleeve.

5. The method according to claim 2, wherein said first end of the first tube and said first end of the second tube are of complementary frustoconical shapes suitable for being arranged in abutment one against the other to form said contact surfaces.

6. The method according to claim 1, wherein each of said plurality of coaxial circular welding zones is made with a plurality of discontinuous ones of said one or more conductive welding elements that are juxtaposed or spaced apart extending around the entire perimeter of said interface.

7. The method according to claim 6, wherein said discontinuous ones of said one or more conductive welding elements are constituted by the plurality of conductive welding balls arranged circularly so as to extend around the entire circumference of said interface in cross-section.

8. The method according to claim 1, wherein one of the first and second tubes has a smaller thickness relative to the other one of the first and second tubes, and the one or more conductive weld elements present a thickness that is less than or equal to half the thickness of the one of the first and second tube having the smaller thickness at said contact surfaces where they are installed.

9. The method according to claim 8, wherein the one or more conductive welding elements are arranged in at least one peripheral pre-machined groove extending in a closed loop around the entire perimeter of said interface.

10. A process for connecting together two unit elements of a fluid transport pipe, each unit pipe element being made of metal alloy and being covered in a liner made of a thermoplastic material with the exception of an end portion not having a liner, the process comprising:
a step of metal welding together the two unit pipe elements placed in abutment at their end portions not having a liner so as to form a cut-back zone in the liner;
a step of positioning a tubular sleeve inside the cut-back zone in the liner and in part around the liners of the two unit pipe elements, the sleeve being made of a thermoplastic material; and
a step of fastening the sleeve on the liners of the two unit pipe elements in leakproof manner by induction welding using an assembly method according to claim 1.

* * * * *